(12) United States Patent
Sato et al.

(10) Patent No.: US 7,366,309 B2
(45) Date of Patent: Apr. 29, 2008

(54) ROBOT

(75) Inventors: Miki Sato, Tokyo (JP); Akihiko Sugiyama, Tokyo (JP); Shin'ichi Ohnaka, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 10/933,405

(22) Filed: Sep. 3, 2004

(65) Prior Publication Data
US 2005/0195989 A1 Sep. 8, 2005

(30) Foreign Application Priority Data
Mar. 8, 2004 (JP) ............................. 2004-064601

(51) Int. Cl.
*H04R 3/00* (2006.01)
(52) U.S. Cl. ...................... 381/92; 381/71.1; 381/94.1; 381/71.7; 381/94.5; 381/123; 381/110
(58) Field of Classification Search ............... 381/71.1, 381/92, 94.1, 26–28, 110, 94.7, 123, 71.7, 381/94.5
See application file for complete search history.

(56) References Cited
U.S. PATENT DOCUMENTS

| 5,754,665 | A | * | 5/1998 | Hosoi ......................... 381/94.1 |
| 5,978,824 | A |   | 11/1999 | Ikeda |
| 6,639,986 | B2 | * | 10/2003 | Kanamori et al. ......... 381/71.1 |
| 6,738,482 | B1 | * | 5/2004 | Jaber ......................... 381/94.7 |
| 6,963,649 | B2 | * | 11/2005 | Vaudrey et al. ............ 381/94.7 |
| 2002/0089297 | A1 | * | 7/2002 | Filo ....................... 318/568.12 |
| 2003/0078694 | A1 | * | 4/2003 | Watanabe et al. ........... 700/245 |
| 2003/0185410 | A1 | * | 10/2003 | June et al. ................. 381/94.1 |

FOREIGN PATENT DOCUMENTS

| JP | 10-215194 | | 8/1998 |
| JP | 0-2000-326274 | * | 11/2000 |
| JP | 2000-326274 | * | 11/2000 |
| JP | 2003-326479 | | 11/2003 |

* cited by examiner

*Primary Examiner*—Vivian Chin
*Assistant Examiner*—Disler Paul
(74) *Attorney, Agent, or Firm*—Foley & Lardner LLP

(57) ABSTRACT

A robot includes first and second microphones and movable portions. The first microphone gathers a first sound reception signal by gathering mainly a target signal. The second microphone gathers a second reception sound signal by gathering mainly noise other than the target signal. The movable portions operate on the basis of the first sound reception signal output from the first microphone and the second sound reception signal output from the second microphone.

28 Claims, 13 Drawing Sheets

101
101a   101b

102
102a   102b

ROBOT

BACKGROUND OF THE INVENTION

The present invention relates to a robot which operates in accordance with the signal obtained by a sound gathering means such as a microphone.

As a means for determining the operation of a robot, a technique of using the signal input from a microphone is available. As such a robot, a robot is disclosed in, for example, Japanese Patent Laid-Open Nos. 2003-326479 and 2000-326274, which is designed to perform voice recognition by using the signal input from the microphone placed near a speaker. The signal input from the microphone can also be directly transferred to an apparatus without being processed.

FIG. 15 shows the arrangement of a conventional robot represented by these robots.

This robot includes a robot body 43 comprising movable portions such as a hand 41 and feet 42a and 42b. A microphone 1 which outputs a signal having undergone acoustoelectric conversion is mounted on the robot body 43. The robot body 43 also incorporates a voice recognition circuit 4, control circuit 5, and driving circuit 6. The voice recognition circuit 4 performs voice recognition with respect to the signal output from the microphone 1. The control circuit 5 generates a control signal upon reception of a recognition result from the voice recognition circuit 4. The driving circuit 6 drives movable portions such as the hand 41 and feet 42a and 42b upon reception of the control signals output from the control circuit 5.

As described above, by supplying an output signal from the microphone 1 to the voice recognition circuit 4, the operation of the robot can be determined on the basis of the target signal generated near the microphone 1.

If, however, a signal other than the target signal, i.e., noise, exists at the time of the generation of a target signal, a mixed signal of the target signal and noise is input to the microphone 1. For this reason, it is difficult for the conventional robot to accurately acquire a target signal when noise is present near the robot. As a consequence, for example, the robot does not properly operate.

SUMMARY OF THE INVENTION

The present invention has been made to solve the above problem, and has as its object to provide a robot which can obtain a high-precision target signal even if noise is present near the robot.

In order to achieve the above object, according to the present invention, there is provided a robot comprising first sound gathering means for generating a first sound reception signal by gathering mainly a target signal, second sound gathering means for generating a second reception sound signal by gathering mainly noise other than the target signal and first operation means which operates on the basis of the first sound reception signal output from the first sound gathering means and the second sound reception signal output from the second sound gathering means.

DESCRIPTION OF THE PREFERRED EMBODIMENTS

The embodiments of the present invention will be described in detail next with reference to the accompanying drawings. Each embodiment in which the present invention is applied to a robot which processes a voice signal will be described.

First Embodiment

Figure 1:
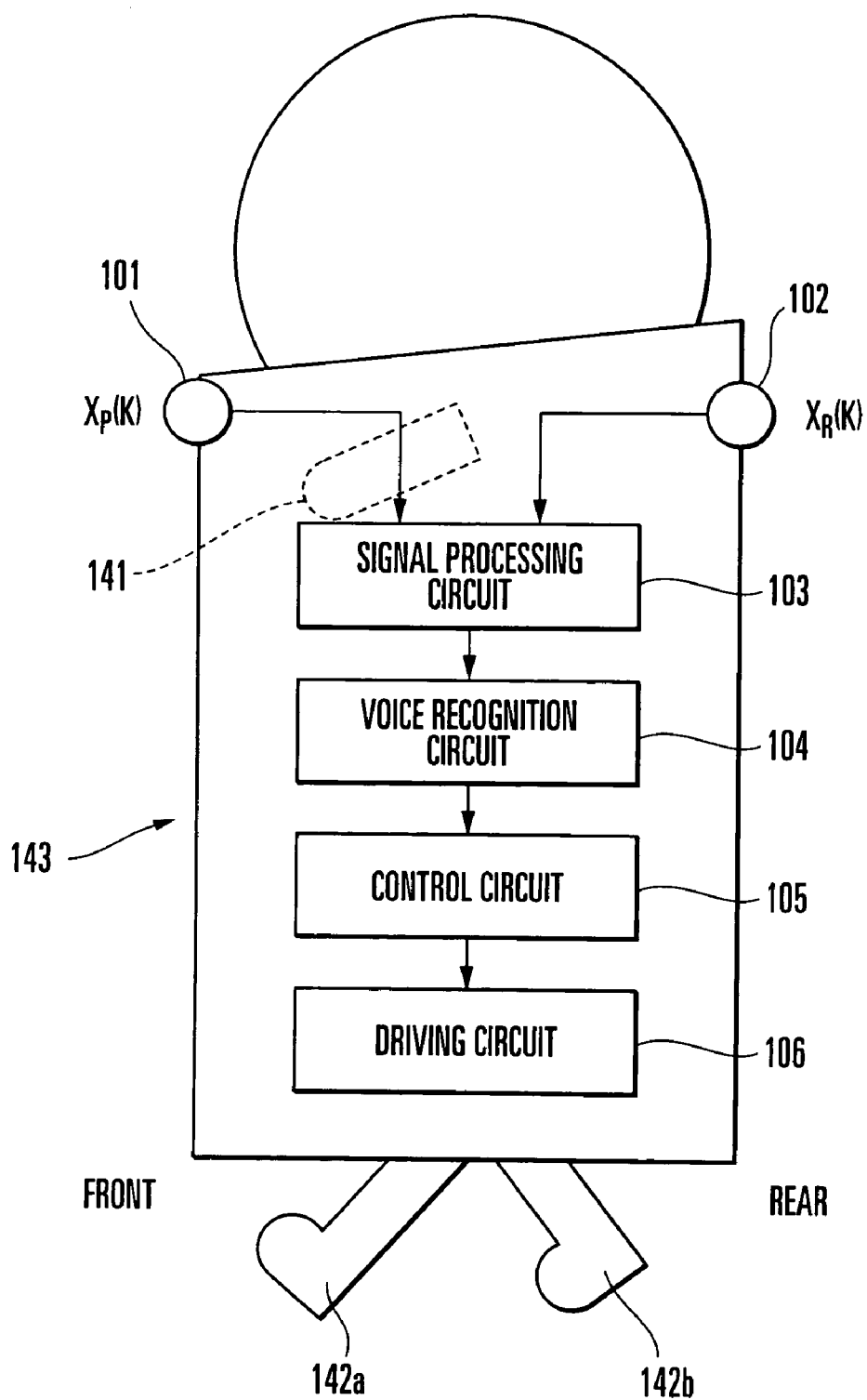
FIGS. 1 is a view showing the arrangement of a robot according to the first embodiment of the present invention.

FIG. 1 shows the arrangement of a robot according to the first embodiment of the present invention.

Figure 15:
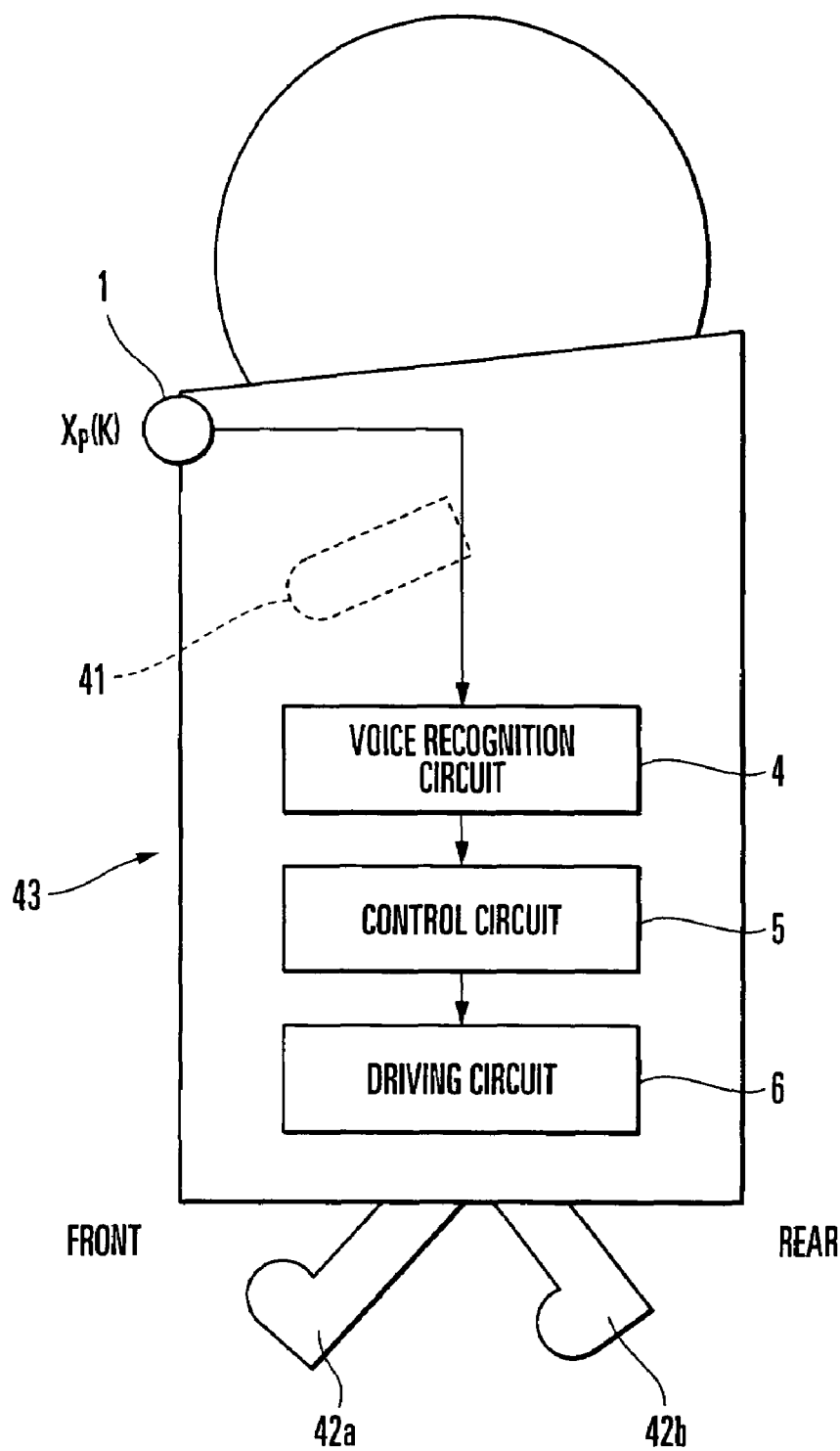
FIG. 15 is a view showing the arrangement of a conventional robot.

The robot according to the first embodiment includes a robot body 143 comprising movable portions (first operation means) such as a hand 141 and feet 142a and 142b. A microphone (first sound gathering means) 101 and microphone (second sound gathering means) 102 are mounted on the robot body 143. The robot body 143 also incorporates a signal processing circuit (noise reducing means) 103, voice recognition circuit 104, control circuit 105, and driving circuit 106. That is, this robot includes the microphone 102 and signal processing circuit 103 in addition to the components of the conventional robot shown in FIG. 15.

Each portion of the robot according to the first embodiment will be described in detail below.

The microphone 101 is mounted on the front surface of the robot body 143. The microphone 101 generates a first sound reception signal by performing acoustoelectric conversion of an acoustic signal (target signal) mainly arriving from the front of the robot. In the first embodiment, the microphone 101 outputs the first sound reception signal as a main signal $X_P(k)$.

The microphone 102 is mounted on the rear surface of the robot body 143. The microphone 102 generates a second sound reception signal by performing acoustoelectric conversion of an acoustic signal (noise other than a target signal) mainly arriving from the rear of the robot. In the first embodiment, the microphone 102 outputs the second sound reception signal as a reference signal $X_R(k)$.

The signal processing circuit 103 receives the main signal $X_P(k)$ and reference signal $X_R(k)$ and outputs the low-noise signal obtained by reducing the noise components of the target signal.

The voice recognition circuit 104 receives the low-noise signal and performs voice recognition to output a voice recognition result.

The control circuit 105 receives the voice recognition result to generate and output a control signal.

The driving circuit 106 receives the control signal and drives movable portions of the robot body 143 such as the hand 141 and the feet 142a and 142b.

The above microphones are general devices (transducers) which convert acoustic signals into electrical signals and are not limited to devices in the general shapes of microphones. For example, a loudspeaker is known as a device which converts an electrical signal into an acoustic signal but can also be used as a microphone by impedance conversion of an output from the loudspeaker. Therefore, a device used by such a method, a transducer using an ultrathin ceramic plate, and the like are generically called microphones.

The "front of the robot" indicates the direction in which the user is usually present from the view of the robot when the user uses the robot. The front surface of the robot body 143 indicates the portion of the robot body 143 which faces the front of the robot. By mounting the microphone 101 on the front surface of the robot body 143, the microphone 101 can acquire an acoustic signal arriving from the direction in which the user generates a target signal with the highest probability.

The "rear of the robot" indicates the direction opposite to the direction indicated by the front of the robot. The rear surface of the robot body 143 indicates the portion of the robot body 143 which faces the rear of the robot. By mounting the microphone 102 on the rear surface of the robot body 143, the microphone 102 can acquire an acoustic signal arriving from the direction in which the user generates a target signal with the lowest probability.

Figure 2:
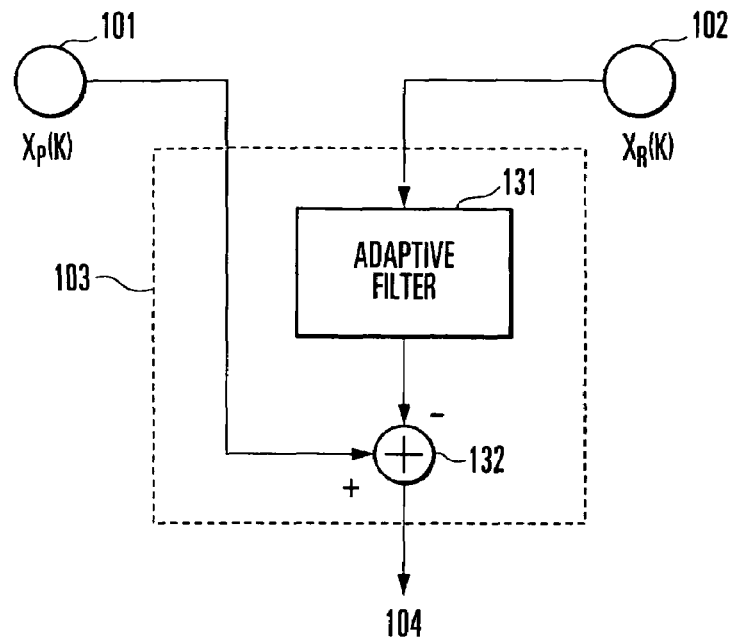
FIG. 2 is a block diagram showing an example of the arrangement of a signal processing circuit.

FIG. 2 shows an example of the arrangement of the signal processing circuit 103. The signal processing circuit 103 generates a pseudo sound reception signal from the reference signal $X_R(k)$ output from the microphone 102 by using an adaptive filter 131 which approximates the acoustic path between the microphone 102 and the microphone 101. The signal processing circuit 103 then generates a difference signal by subtracting the pseudo sound reception signal from the main signal $X_P(k)$ output from the microphone 101 by using a subtractor 132. The signal processing circuit 103 outputs this difference signal as a low-noise sound signal.

This operation can also be described as follows. A pseudo signal mixed in the main signal $X_P(k)$ is generated from the reference signal $X_R(k)$ by using the adaptive filter 131 which approximates the impulse response of the acoustic path along which an acoustic signal arriving at the input terminal for the reference signal $X_R(k)$ arrives at the input terminal for the main signal $X_P(k)$. A difference signal is generated by subtracting an estimated signal from the main signal $X_P(k)$ using the subtractor 132. This difference signal is output as a low-noise signal.

Figure 3:
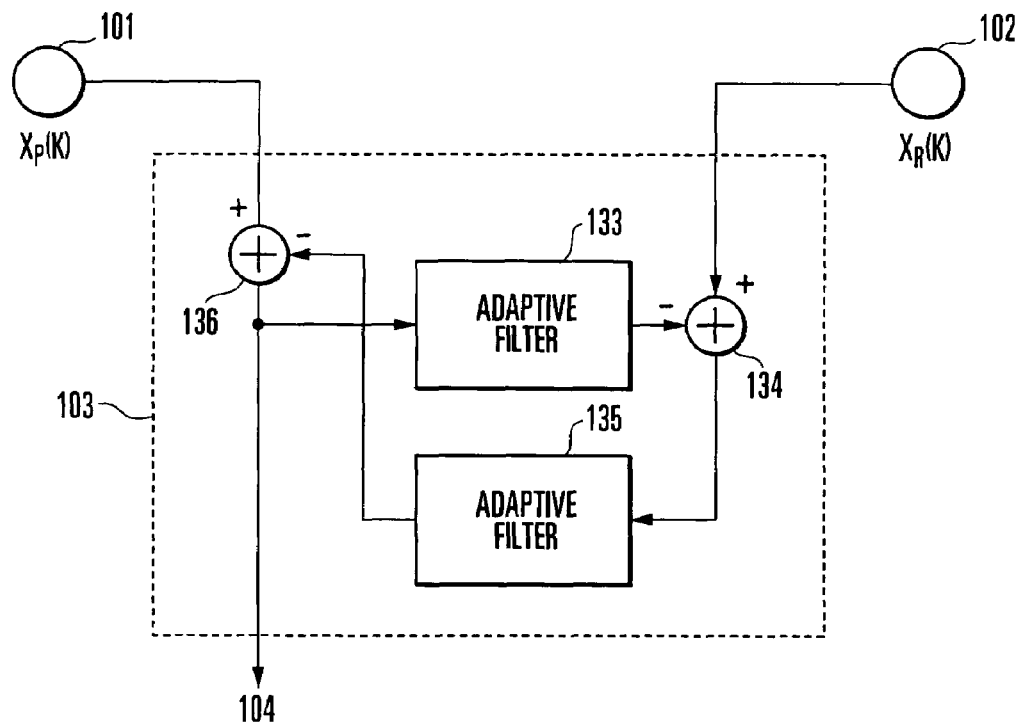
FIG. 3 is a block diagram showing another example of the arrangement of the signal processing circuit.

FIG. 3 shows another example of the arrangement of the signal processing circuit 103. The signal processing circuit 103 uses a first adaptive filter 133 which approximates the acoustic path between the microphone 101 and the microphone 102 and generates a first pseudo sound reception signal from an input signal to the first adaptive filter 133. The signal processing circuit 103 then generates a first difference signal by subtracting the first pseudo sound reception signal from the reference signal $X_R(k)$ output from the microphone 102 by using a first subtractor 134. In addition, the signal processing circuit 103 uses a second adaptive filter 135 which approximates the acoustic path between the microphone 102 and the microphone 101 and generates a second pseudo sound reception signal from the first difference signal output from the first subtractor 134. The signal processing circuit 103 generates a second difference signal by subtracting the second pseudo sound reception signal from the main signal $X_P(k)$ output from the microphone 101 by using a second subtractor 136. The second difference signal is supplied to the first adaptive filter 133 and is also output as a low-noise signal. Note that the example of the arrangement of the signal processing circuit 103 in FIG. 3 is disclosed in Japanese Patent Laid-Open No. 10-215194.

With the above arrangement, according to the robot according to the first embodiment, when a target signal is generated from the front of the robot and noise other than the target signal is generated from the rear of the robot, the low-noise signal obtained by reducing the influence of noise mixed in the main signal $X_P(k)$ output from the microphone 101 is supplied to the voice recognition circuit 104. As a consequence, the voice recognition ratio of the robot improves, and the robot can operate accurately.

The optimal arrangement of the microphones 101 and 102 is that the directions of the microphones 101 and 102 face straight the robot. The microphones 101 and 102 are preferably arranged at an angle of 90° or more. However, various modifications can be made within the range in which the direction of the microphone 101 does not coincide with that of the microphone 102.

Second Embodiment

Figure 4:
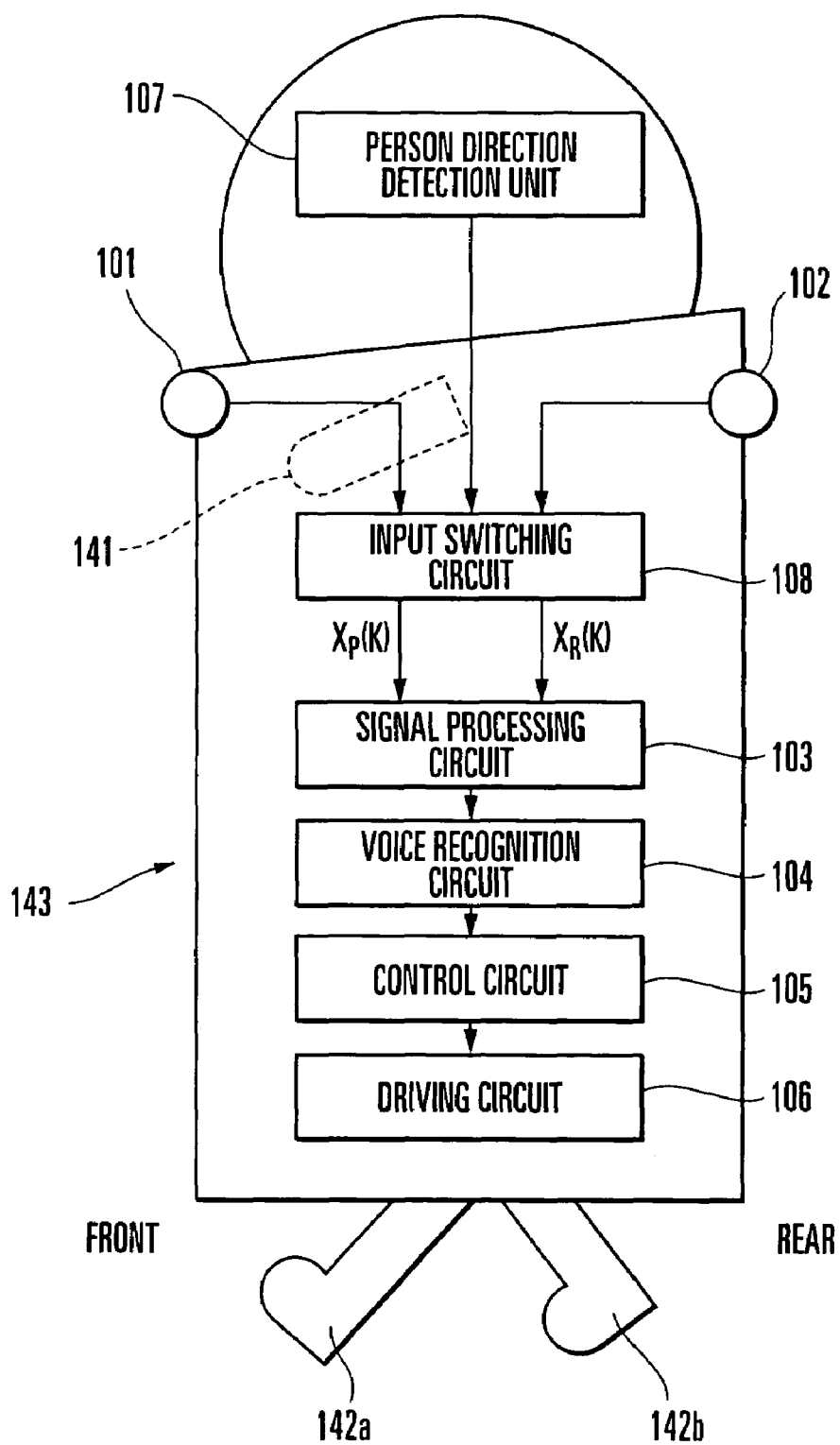
FIG. 4 is a view showing the arrangement of a robot according to the second embodiment of the present invention.

FIG. 4 shows the arrangement of a robot according to the second embodiment of the present invention. The same reference numerals as in FIG. 1 denote the same or equivalent components in FIG. 4.

The robot according to the second embodiment includes a person direction detection unit (target signal source direction detection means) 107 and input switching circuit 108 in addition to the components of the robot according to the first embodiment shown in FIG. 1. Other arrangements are the same as those of the robot according to the first embodiment. The person direction detection unit 107 and input switching circuit 108 will be described, but a description of the same elements will be omitted.

The person direction detection unit 107 includes a function of detecting a person (target signal source) around the robot and a function of outputting direction information indicating the direction of a person when detected. In person detection, for example, image information acquired by a video camera, digital CCD camera, or the like is processed, and it is determined on the basis of the size of the face of the person, the positions of the eyes, and the like whether or not any person is present within the range in which the image is acquired. Person detection can also be performed by using an infrared sensor or the like. Alternatively, the direction of a person can be detected on the basis of the phase differences between the acoustic signals output from a plurality of microphones.

The input switching circuit 108 receives the first sound reception signal output from a microphone 101, the second sound reception signal output from a microphone 102, and the direction information output from the person direction detection unit 107, and supplies the first and second sound reception signals to a signal processing circuit 103 without any change or upon switching them on the basis of the direction information. More specifically, if the direction of the person coincides with the front of the robot, the input switching circuit 108 supplies the first sound reception signal as a main signal $X_P(k)$ to the signal processing circuit 103, and supplies the second sound reception signal as a reference signal $X_R(k)$ to the signal processing circuit 103. In contrast to this, if the direction of the person coincides with the rear of the robot, the input switching circuit 108 supplies the second sound reception signal as the main signal $X_P(k)$ to the signal processing circuit 103, and supplies the first sound reception signal as the reference signal $X_R(k)$ to the signal processing circuit 103.

With the above arrangement, according to the robot of the second embodiment, when a target signal is generated from the front of the robot and noise other than the target signal is generated from the rear of the robot, the low-noise signal obtained by reducing the influence of noise mixed in an output signal from the microphone 101 is supplied to a voice recognition circuit 104. In addition, when a person generates a target signal from the rear of the robot and noise other than the target signal is generated from the front of the robot, the low-noise signal obtained by reducing the influence of noise mixed in an output signal from the microphone 102 is supplied to the voice recognition circuit 104. As a consequence, the voice recognition ratio of the robot improves, and the robot can operate accurately.

Even a change in the direction of a person can be properly handled by switching input signals. In this case, since the robot need not operate, switching operation can be done in a period of time shorter than the operation time of the robot.

Although the second embodiment has exemplified the case wherein input signals are switched depending on whether the direction of a person coincides with the front or rear of the robot, input signals may be switched depending on whether the direction of the person is closer to the direction of the microphone 101 or the direction of the microphone 102.

Third Embodiment

Figure 5:
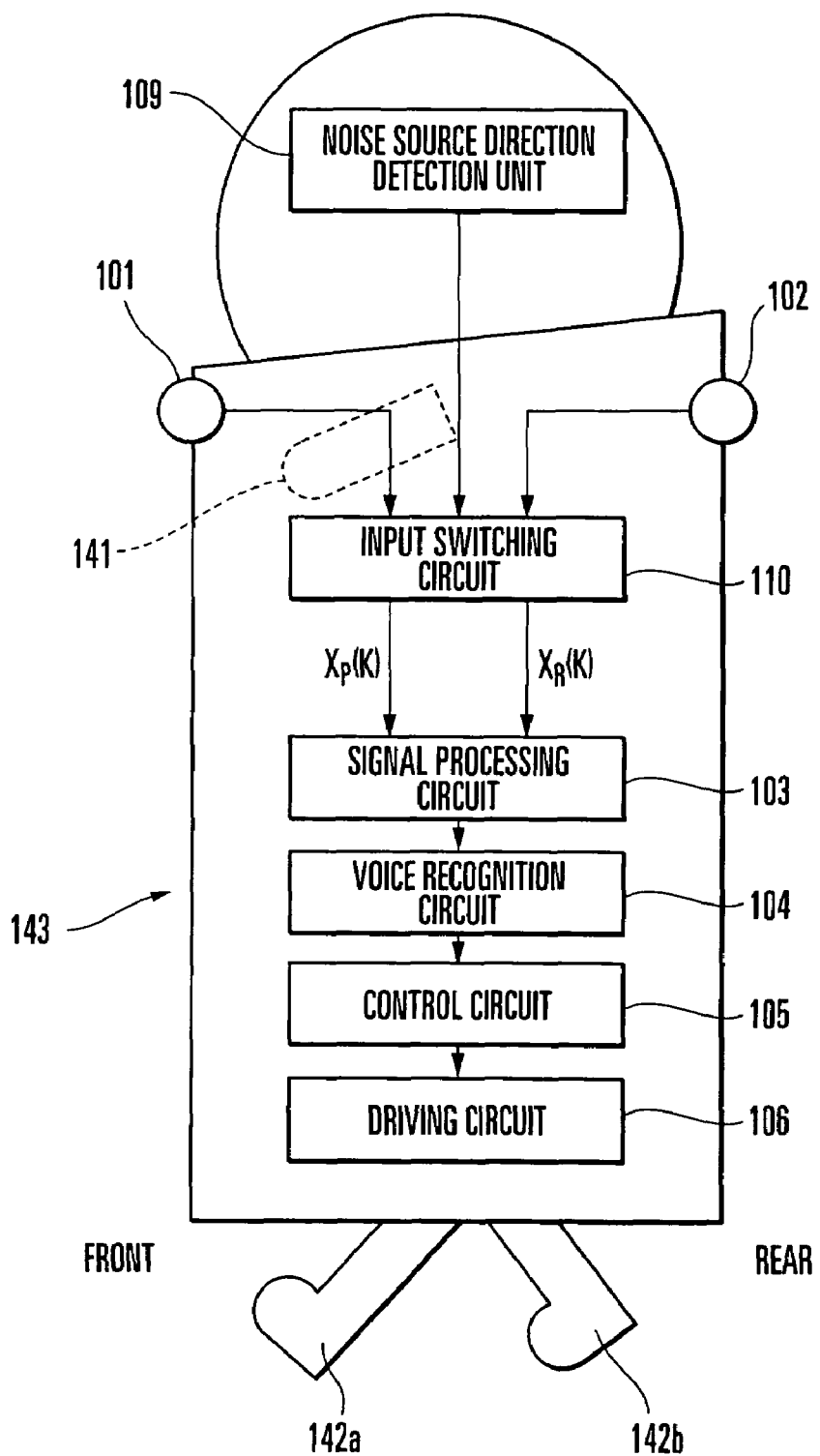
FIG. 5 is a view showing the arrangement of a robot according to the third embodiment of the present invention.

FIG. 5 shows the arrangement of a robot according to the third embodiment of the present invention. The same reference numerals as in FIG. 1 denote the same or equivalent components in FIG. 5.

The robot according to the third embodiment includes a noise source direction detection unit 109 and input switching circuit 110 in addition to the components of the robot according to the first embodiment shown in FIG. 1. Other arrangements are the same as those of the robot according to the first embodiment. The noise source direction detection unit 109 and input switching circuit 110 will be described below, but a description of the same elements will be omitted.

The noise source direction detection unit 109 includes a function of detecting a noise source around the robot and a function of outputting direction information indicating the direction of a noise source when it is detected. When, for example, a TV set is to be detected as a noise source, the image information acquired by a video camera, digital CCD camera, or the like is processed to check on the basis of a rectangular which is the shape of a TV screen, brightness, or the like whether any TV set is present within the range in which the image is acquired. Note that a noise source other than a TV set can also be detected. In addition, a noise source direction can be detected on the basis of the phase differences between the acoustic signals output from a plurality of microphones. Alternatively, if a radio device or the like is mounted on a noise source in advance, a noise source direction can be detected on the basis of the signal generated by the radio device.

The input switching circuit 110 receives the first sound reception signal output from a microphone 101, the second sound reception signal output from a microphone 102, and the direction information output from the noise source direction detection unit 109, and supplies the first and second sound reception signals to a signal processing circuit 103 without any change or upon switching them on the basis of the direction information. More specifically, if the noise source direction coincides with the rear of the robot, the input switching circuit 110 supplies the first sound reception signal as a main signal $X_P(k)$ to the signal processing circuit 103, and supplies the second sound reception signal as a reference signal $X_R(k)$ to the signal processing circuit 103. In contrast to this, if the noise source direction coincides with the front of the robot, the input switching circuit 110 supplies the second sound reception signal as the main signal $X_P(k)$ to the signal processing circuit 103, and supplies the first sound reception signal as the reference signal $X_R(k)$ to the signal processing circuit 103.

With the above arrangement, according to the robot of the third embodiment, when a noise source generates noise other than a target signal from the rear of the robot and a target signal is generated from the front of the robot, the low-noise signal obtained by reducing the influence of noise mixed in an output signal from the microphone 101 is supplied to a voice recognition circuit 104. In addition, when a noise source generates noise other than a target signal from the front of the robot and a target signal is generated from the rear of the robot, the low-noise signal obtained by reducing the influence of noise mixed in an output signal from the microphone 102 is supplied to the voice recognition circuit 104. As a consequence, the voice recognition ratio of the robot improves, and the robot can operate accurately.

Even a change in the direction of a noise source can be properly handled by switching input signals. In this case, since the robot need not operate, switching operation can be done in a period of time shorter than the operation time of the robot.

Although the third embodiment has exemplified the case wherein input signals are switched depending on whether the direction of a noise source coincides with the front or rear of the robot, input signals may be switched depending on whether the direction of the noise source is closer to the direction of the microphone 101 or the direction of the microphone 102.

Fourth Embodiment

Figure 6:
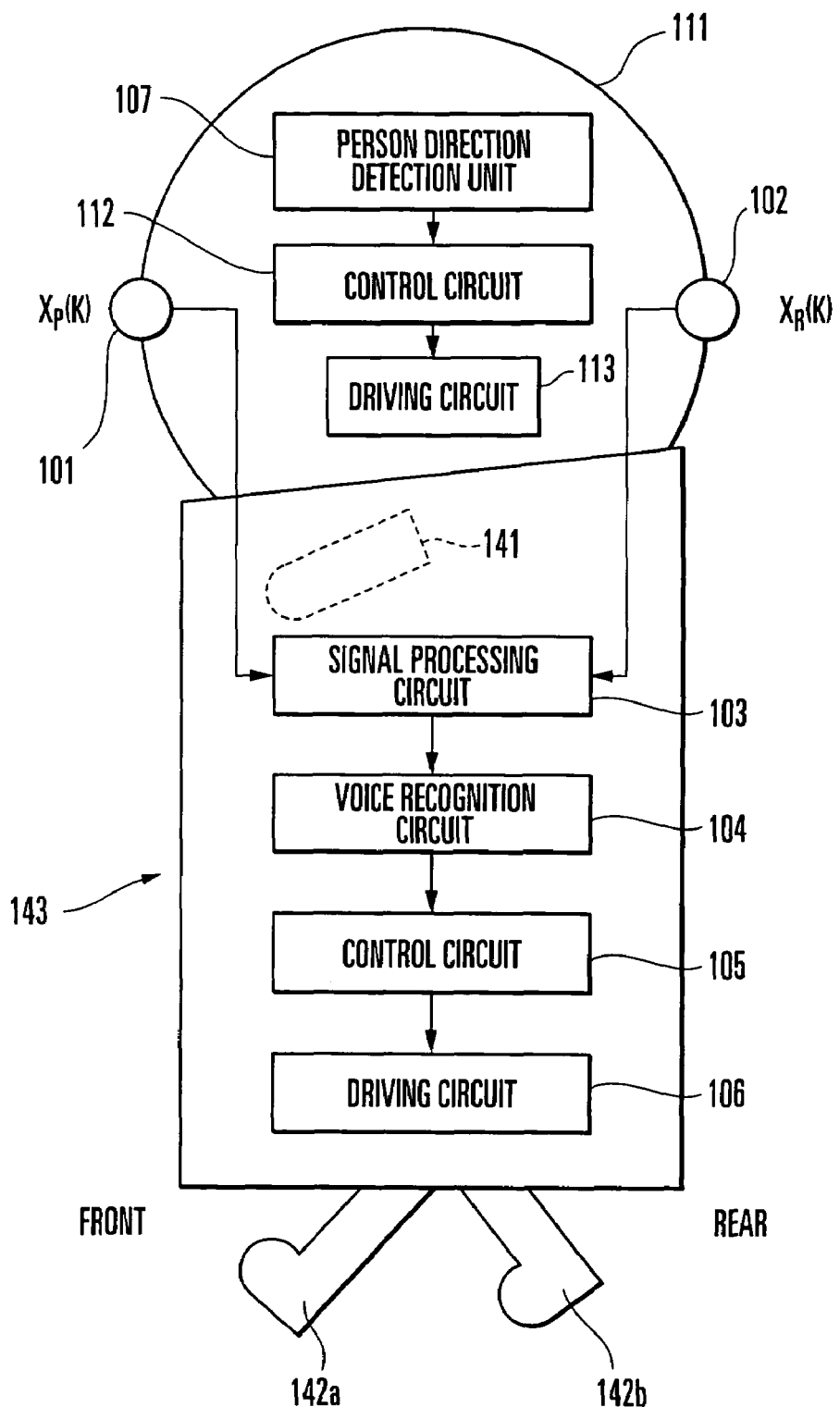
FIG. 6 is a view showing the arrangement of a robot according to the fourth embodiment of the present invention.

FIG. 6 shows the arrangement of a robot according to the fourth embodiment of the present invention. The same reference numerals as in FIGS. 1 and 4 denote the same or equivalent components in FIG. 6.

The robot according to the fourth embodiment includes a person direction detection unit (target signal source direction detection means) 107, operation unit (second operation means) 111, control circuit 112, and driving circuit 113 in addition to the components of the robot according to the first embodiment shown in FIG. 1.

In the fourth embodiment, a microphone 101 is mounted on the front surface of the operation unit 111. The microphone 101 generates a first sound reception signal by performing acoustoelectric conversion of an acoustic signal (target signal) mainly arriving from the front of the operation unit 111. The microphone 101 supplies the first sound reception signal as a main signal $X_P(k)$ to a signal processing circuit 103.

A microphone 102 is mounted on the rear surface of the operation unit 111. The microphone 102 generates a second sound reception signal by performing acoustoelectric conversion of an acoustic signal (noise other than a target signal) mainly arriving from the rear of the operation unit 111. The microphone 102 supplies the second sound reception signal as a reference signal $X_R(k)$ to the signal processing circuit 103.

The person direction detection unit 107 is identical to the person direction detection unit 107 of the robot according to the second embodiment. That is, the person direction detection unit 107 includes a function of detecting a person (target signal source) around the robot and a function of outputting direction information indicating the direction of the person when detected.

Upon reception of the direction information, the control circuit 112 generates and outputs a control signal for rotating the operation unit 111 to direct the microphone 101 toward the person. In other words, the control circuit 112 generates and outputs a control signal for making the direction of the microphone 101 coincide with the direction of the person. Note that "the direction of the microphone" indicates the direction in which the microphone exhibits the highest gain within its sound gathering range, but is not limited to the sound gathering range of a single microphone, and includes the direction in which the gain is highest in the sound gathering range of the microphone mounted on an apparatus or the like. In addition, to "coincide with the direction" indicates operation allowing a deviation associated with detection precision or operation precision.

The driving circuit 113 receives the control signal and rotates the operation unit 111. At this time, the driving circuit 113 may rotate a robot body 143 itself by driving feet 142a and 142b of the robot body 143 so as to rotate the operation unit 111 connected to the robot body 143. Rotating the operation unit 111 in this manner makes it possible to direct the microphone 101 mounted on the operation unit 111 toward the person.

Arrangements other than this arrangement are the same as those in the first embodiment shown in FIG. 1.

With the above arrangement, according to the robot of the fourth embodiment, when a person generates a target signal and noise other than the target signal is generated from a direction other than the direction of the person from the view of the robot, the low-noise signal obtained by reducing the influence of noise mixed in the main signal $X_P(k)$ output from the microphone 101 is supplied to a voice recognition circuit 104. As a consequence, the voice recognition ratio of the robot improves, and the robot can operate accurately.

When a person is detected, the person direction detection unit 107 may output position information indicating the position of the person, and the control circuit 112 may generate and output a control signal for directing the microphone 101 toward the position of the person upon reception of the position information.

Fifth Embodiment

Figure 7:
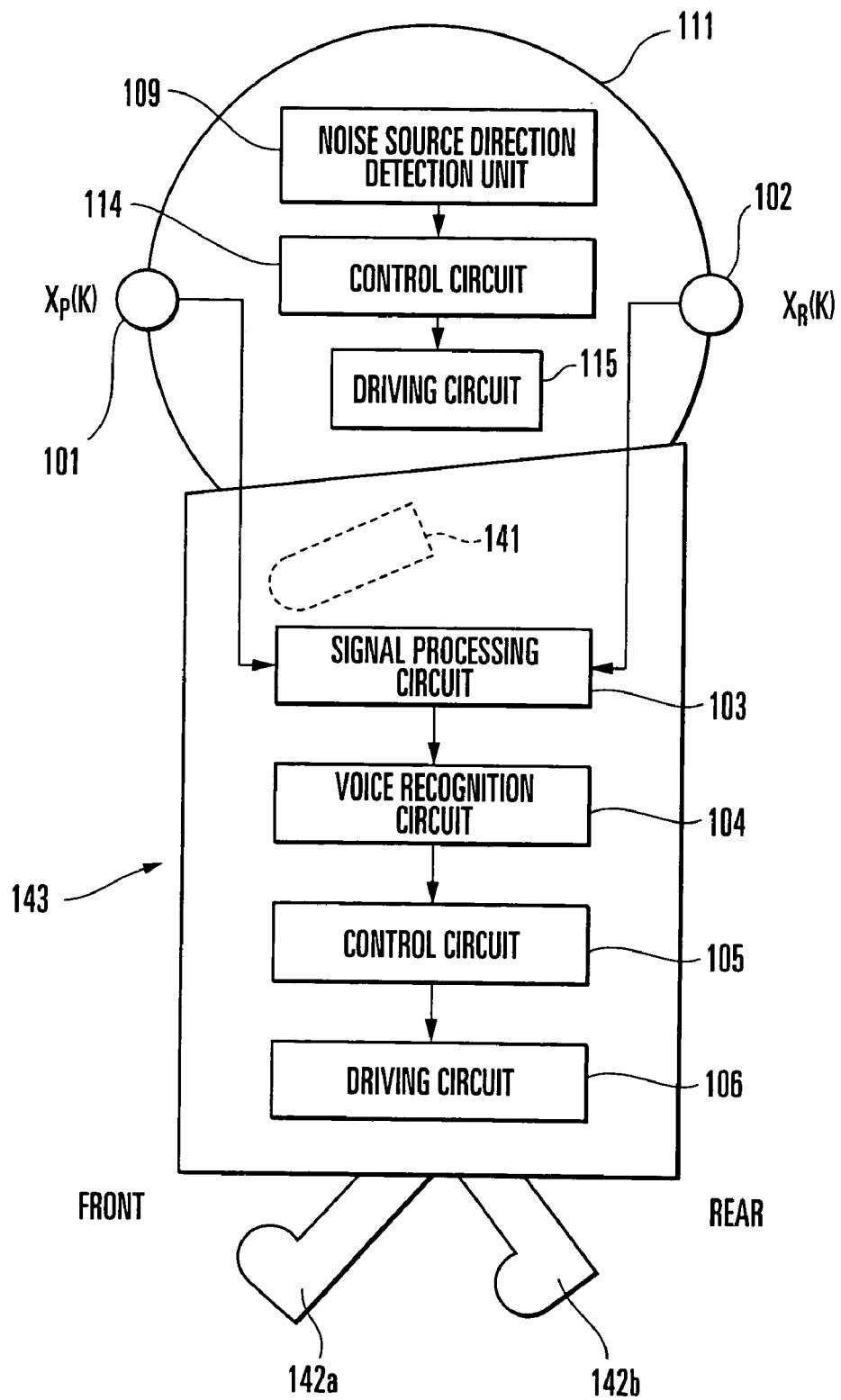
FIG. 7 is a view showing the arrangement of a robot according to the fifth embodiment of the present invention.

FIG. 7 shows the arrangement of a robot according to the fifth embodiment of the present invention. The same reference numerals as in FIGS. 1 and 5 denote the same or equivalent components in FIG. 7.

The robot according to the fifth embodiment includes a noise source direction detection unit 109, operation unit (third operation means) 111, control circuit 112, and driving circuit 115 in addition to the components of the robot according to the first embodiment shown in FIG. 1.

In the fifth embodiment, a microphone 101 is mounted on the front surface of the operation unit 111. The microphone 101 generates a first sound reception signal by performing acoustoelectric conversion of an acoustic signal (target signal) mainly arriving from the front of the operation unit 111. The microphone 101 supplies the first sound reception signal as a main signal $X_P(k)$ to a signal processing circuit 103.

A microphone 102 is mounted on the rear surface of the operation unit 111. The microphone 102 generates a second sound reception signal by performing acoustoelectric conversion of an acoustic signal (noise other than a target signal) mainly arriving from the rear of the operation unit 111. The microphone 102 supplies the second sound reception signal as a reference signal $X_R(k)$ to the signal processing circuit 103.

The noise source direction detection unit 109 is identical to the noise source direction detection unit 109 of the robot according to the third embodiment. That is, the noise source direction detection unit 109 includes a function of detecting a noise source around the robot and a function of outputting direction information indicating the direction of the noise source when detected.

Upon reception of the direction information, the control circuit 114 generates and outputs a control signal for rotating the operation unit 111 so as to direct the microphone 102 toward the noise source. In other words, the control circuit 114 generates and outputs a control signal for making the direction of the microphone 102 coincide with the direction of the noise source.

The driving circuit 115 receives the control signal and rotates the operation unit 111. At this time, the driving circuit 113 may rotate a robot body 143 itself by driving feet 142a and 142b of the robot body 143, thereby rotating the operation unit 111 connected to the robot body 143. Rotating the operation unit 111 in this manner makes it possible to direct the microphone 102 mounted on the operation unit 111 toward the noise source.

Arrangements other than this arrangement are the same as those in the first embodiment shown in FIG. 1.

With the above arrangement, according to the robot of the fifth embodiment, when a noise source generates noise other than a target signal and a target signal is generated from a direction other than the direction of the noise source from the view of the robot, the low-noise signal obtained by reducing the influence of noise mixed in the main signal $X_P(k)$ output from the microphone 101 is supplied to a voice recognition circuit 104. As a consequence, the voice recognition ratio of the robot improves, and the robot can operate accurately.

When a noise source is detected, the noise source direction detection unit 109 may output position information indicating the position of the noise source, and the control circuit 114 may generate and output a control signal for directing the microphone 102 toward the position of the noise source upon reception of the position information.

Sixth Embodiment

Figure 8:
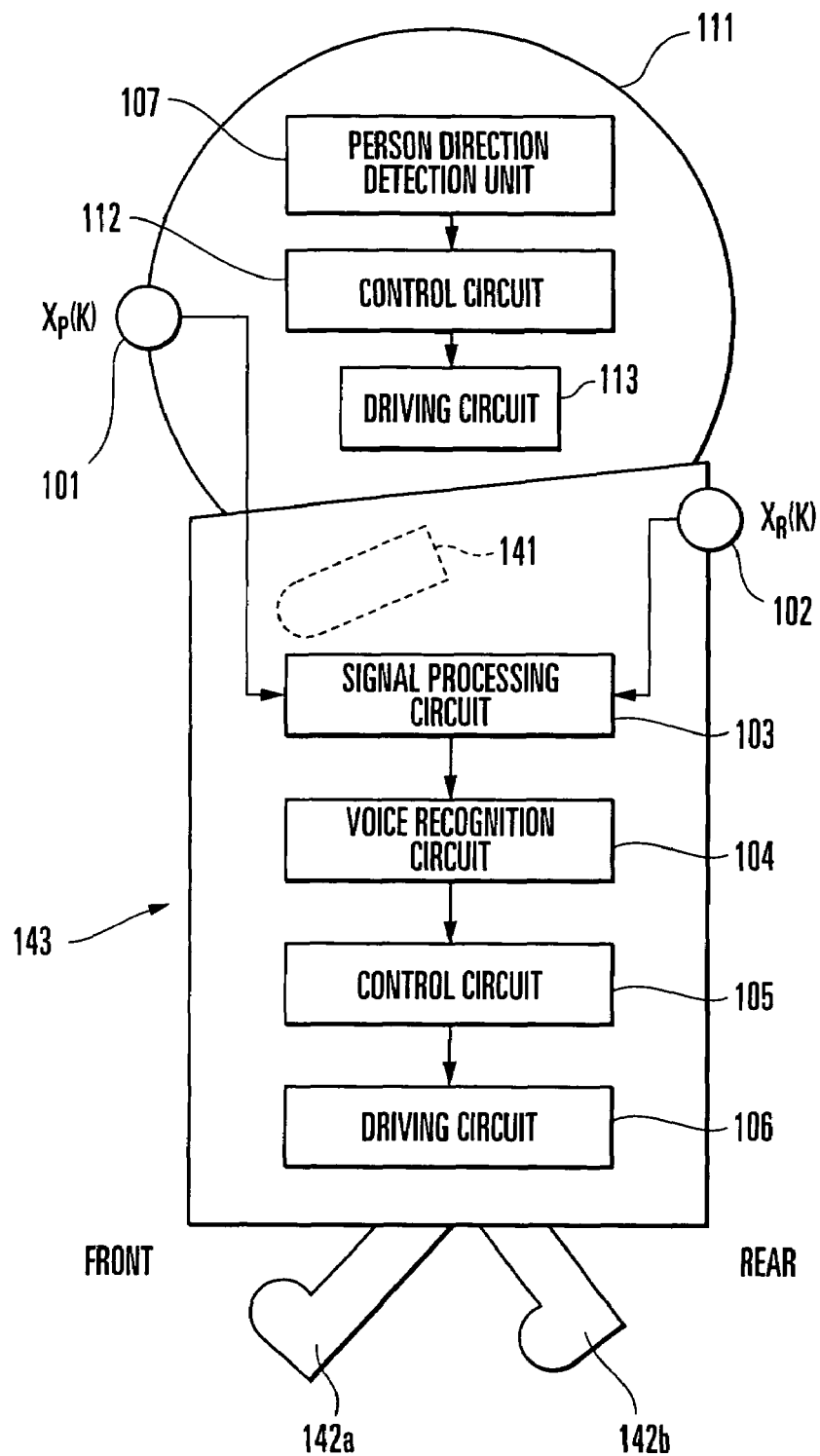
FIG. 8 is a view showing the arrangement of a robot according to the sixth embodiment of the present invention.

FIG. 8 shows the arrangement of a robot according to the sixth embodiment of the present invention. The same reference numerals as in FIGS. 1, 4 and 6 denote the same or equivalent components in FIG. 8.

The robot according to the sixth embodiment has the same arrangement as that shown in FIG. 6 except that a microphone 102 is mounted on the rear surface of a robot body 143 instead of an operation unit 111.

In the sixth embodiment, a microphone 101 is mounted on the front surface of the operation unit 111. The microphone 101 generates a first sound reception signal by performing acoustoelectric conversion of an acoustic signal (target signal) mainly arriving from the front of the operation unit 111. The microphone 101 supplies the first sound reception signal as a main signal $X_P(k)$ to a signal processing circuit 103.

The microphone 102 is mounted on the rear surface of the robot body 143. The microphone 102 generates a second sound reception signal by performing acoustoelectric conversion of an acoustic signal (noise other than a target signal) mainly arriving from the rear of the robot body 143. The microphone 102 supplies the second sound reception signal as a reference signal $X_R(k)$ to the signal processing circuit 103.

Other arrangements are the same as those in the fourth embodiment shown in FIG. 6.

With the above arrangement, according to the robot of the sixth embodiment, when a person generates a target signal from a direction other than the direction of the microphone 102 and noise other than the target signal is generated from the rear of the robot body 143, the low-noise signal obtained by reducing the influence of noise mixed in the main signal $X_P(k)$ output from the microphone 101 is supplied to a voice recognition circuit 104. As a consequence, the voice recognition ratio of the robot improves, and the robot can operate accurately.

Seventh Embodiment

Figure 9:
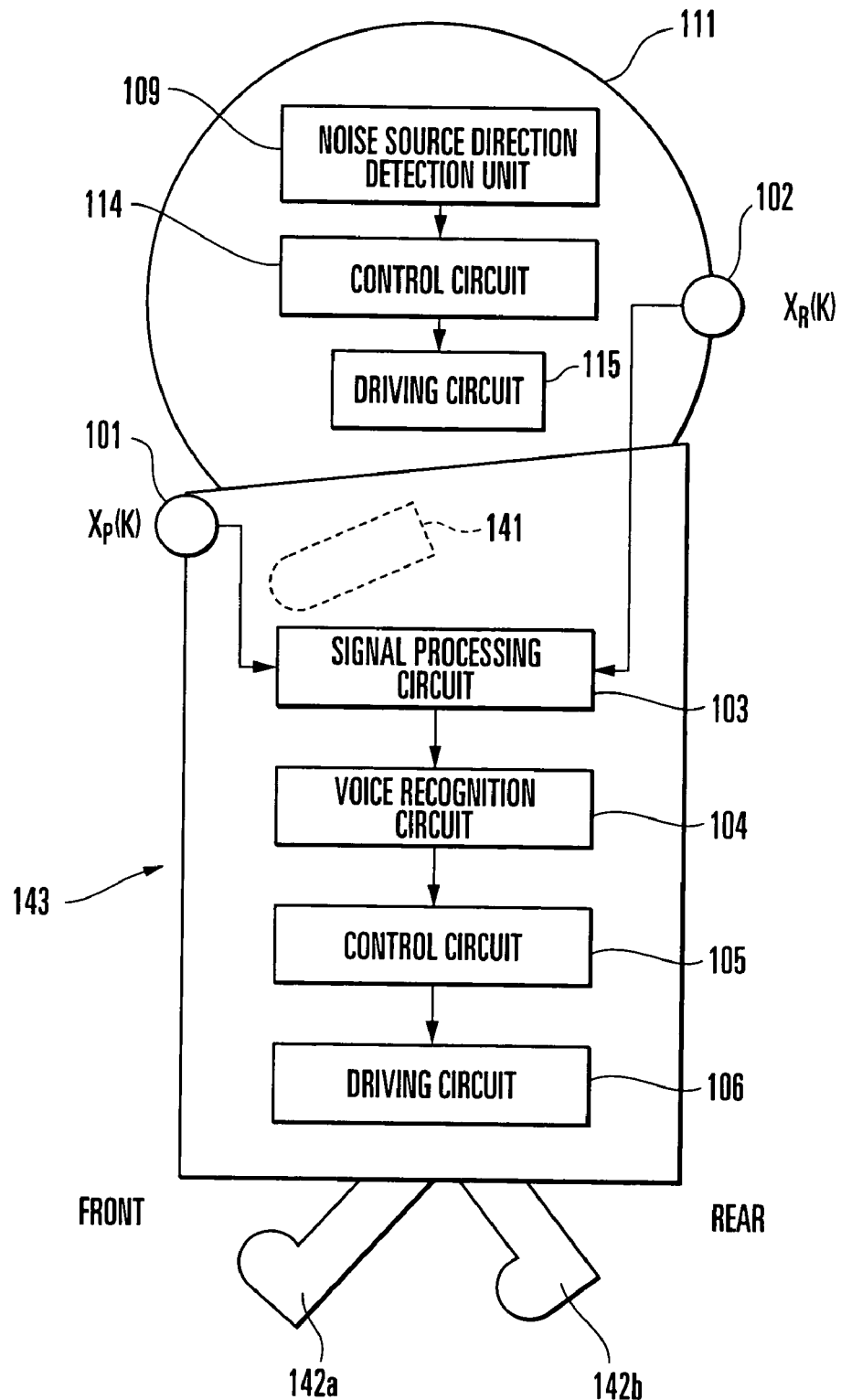
FIG. 9 is a view showing the arrangement of a robot according to the seventh embodiment of the present invention.

FIG. 9 shows the arrangement of a robot according to the seventh embodiment of the present invention. The same reference numerals as in FIGS. 1, 5 and 7 denote the same or equivalent components in FIG. 9.

The robot according to the seventh embodiment has the same arrangement as that shown in FIG. 7 except that a microphone 101 is mounted on the front surface of a robot body 143 instead of an operation unit 111.

In the seventh embodiment, a microphone 101 is mounted on the front surface of the robot body 143. The microphone 101 generates a first sound reception signal by performing acoustoelectric conversion of an acoustic signal (target signal) mainly arriving from the front of the robot body 143. The microphone 101 supplies the first sound reception signal as a main signal $X_P(k)$ to a signal processing circuit 103.

A microphone 102 is mounted on the rear surface of the operation unit 111. The microphone 102 generates a second sound reception signal by performing acoustoelectric conversion of an acoustic signal (noise other than a target signal) mainly arriving from the rear of the operation unit 111. The microphone 102 supplies the second sound reception signal as a reference signal $X_R(k)$ to the signal processing circuit 103.

Other arrangements are the same as those in the fifth embodiment shown in FIG. 7.

With the above arrangement, according to the robot of the seventh embodiment, when a person generates a target signal from the front of the robot body 143 and a noise source generates noise other than the target signal from a direction other than the direction of the microphone 101, the low-noise signal obtained by reducing the influence of noise mixed in the main signal $X_P(k)$ output from the microphone 101 is supplied to a voice recognition circuit 104. As a consequence, the voice recognition ratio of the robot improves, and the robot can operate accurately.

Eighth Embodiment

Figure 10:
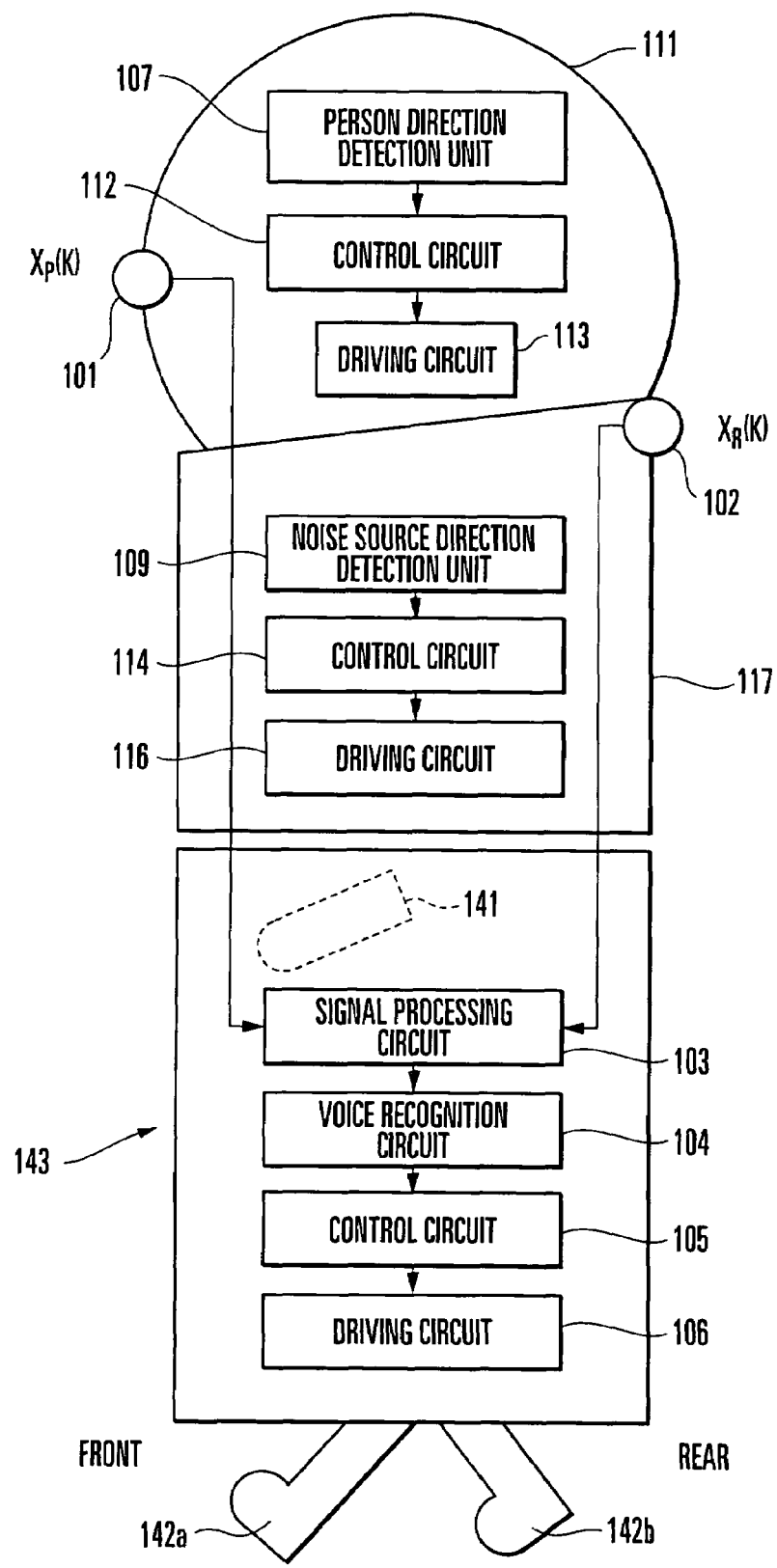
FIG. 10 is a view showing the arrangement of a robot according to the eighth embodiment of the present invention.

FIG. 10 shows the arrangement of a robot according to the eighth embodiment of the present invention. The same reference numerals as in FIGS. 1 and 4 to 9 denote the same or equivalent components in FIG. 10.

The robot according to the eighth embodiment includes a noise source direction detection unit 109, control circuit 114, driving circuit 116, and operation unit 117 in addition to the components of the robot according to the sixth embodiment shown in FIG. 8.

In the eighth embodiment, a microphone 102 is mounted on the rear surface of the operation unit 117. The microphone 102 generates a second sound reception signal by performing acoustoelectric conversion of an acoustic signal (noise other than a target signal) mainly arriving from the rear of the operation unit 117. The microphone 102 supplies the second sound reception signal as a reference signal $X_R(k)$ to a signal processing circuit 103.

The noise source direction detection unit 109 and control circuit 114 are identical to the noise source direction detection unit 109 and control circuit 114 of the robot according to the fifth embodiment shown in FIG. 7. That is, the noise source direction detection unit 109 has a function of detecting a noise source around the robot and a function of outputting direction information indicating the direction of the noise source when detected. Upon reception of the direction information, the control circuit 114 generates and outputs a control signal for rotating the operation unit 117 to direct the microphone 102 toward the noise source.

The driving circuit 116 receives the control signal and rotates the operation unit 117. This makes it possible to direct the microphone 102 mounted on the operation unit 117 toward the noise source.

Other arrangements are the same as those in the sixth embodiment shown in FIG. 8.

With the above arrangement, according to the robot of the eighth embodiment, when a person generates a target signal and a noise source generates noise other than the target signal from a direction other than the direction of a microphone 101, the low-noise signal obtained by reducing the influence of noise mixed in the main signal $X_P(k)$ output from the microphone 101 is supplied to a voice recognition circuit 104. As a consequence, the voice recognition ratio of the robot improves, and the robot can operate accurately.

Ninth Embodiment

Figure 11:
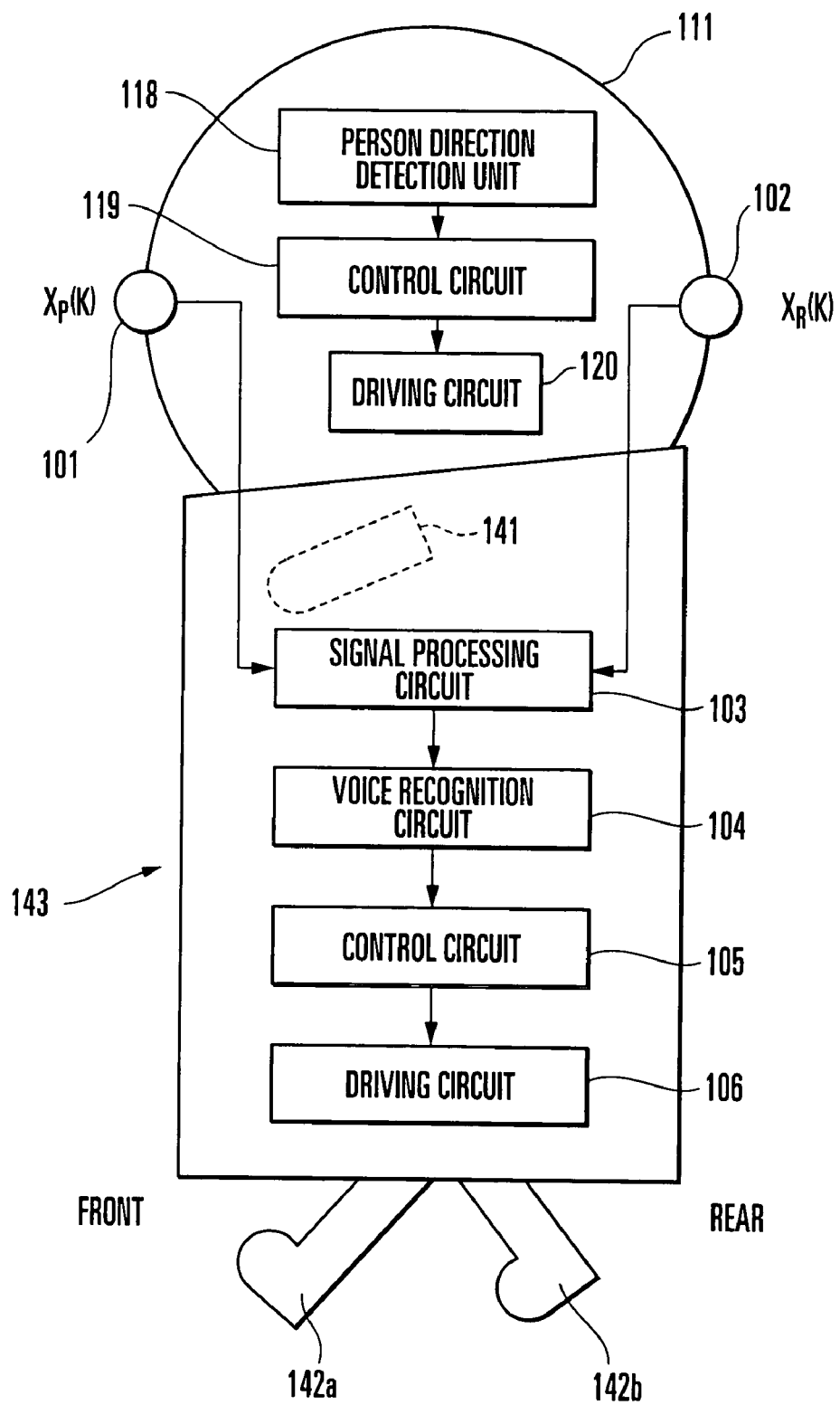
FIG. 11 is a view showing the arrangement of a robot according to the ninth embodiment of the present invention.

FIG. 11 shows the arrangement of a robot according to the ninth embodiment of the present invention. The same reference numerals as in FIG. 1 denote the same or equivalent components in FIG. 11.

The robot according to the ninth embodiment includes a person distance detection unit (target signal source distance detection means) 118, operation unit (fourth operation means) 111, control circuit 119, and driving circuit 120 in addition to the components of the robot according to the first embodiment shown in FIG. 1.

In the ninth embodiment, a microphone 101 is mounted on the front surface of the operation unit 111. The microphone 101 generates a first sound reception signal by performing acoustoelectric conversion of an acoustic signal (target signal) mainly arriving from the front of the operation unit 111. The microphone 101 supplies the first sound reception signal as a main signal $X_P(k)$ to a signal processing circuit 103.

A microphone 102 is mounted on the rear surface of the operation unit 111. The microphone 102 generates a second sound reception signal by performing acoustoelectric conversion of an acoustic signal (noise other than a target signal) mainly arriving from the rear of the robot body 143. The microphone 102 supplies the second sound reception signal as a reference signal $X_R(k)$ to the signal processing circuit 103.

The person distance detection unit 118 has a function of detecting a person (target signal source) around the robot and a function of outputting distance information indicating the distance from the robot to the person. The distance from the robot to the person can be obtained by, for example, mounting two cameras on the robot at a distance from each other, calculating a difference between the two pieces of image information acquired by the cameras, and referring to the distance between the cameras. Alternatively, the distance from the robot to the person can be obtained on the basis of the time interval between the instant at which an acoustic signal is transmitted from a transceiver for acoustic signals such as ultrasonic waves which is mounted on the robot and the instant at which the acoustic signal is reflected by the person and returns to the transceiver.

Upon reception of the distance information, the control circuit 119 generates and outputs a control signal for operating the operation unit 111 to move the microphone 101 closer to the position of the person. More specifically, upon reception of the distance information, the control circuit 119 generates and outputs a control signal for operating the operation unit 111 to set the distance between the microphone 101 and the person to be equal to or less than a predetermined value.

The driving circuit 120 receives the control signal and moves the operation unit 111 closer to the position of the person. At this time, the operation unit 111 connected to the robot body 143 may be moved closer to the position of the person by driving feet 142a and 142b of a robot body 143 so as to move the robot body 143 itself. Moving the operation unit 111 closer to the position of the person in this manner makes it possible to move the microphone 101 mounted on the operation unit 111 closer to the position of the person.

Other arrangements are the same as those in the first embodiment shown in FIG. 1.

Note that upon reception of the distance information, the control circuit 119 may output a control signal for operating the operation unit 111 to move the microphone 101 away from the position of the person (a control signal for operating the operation unit 111 to set the distance between the microphone 101 the person to be equal to more than a predetermined value), and the driving circuit 120 may operate the operation unit 111 to move away from the person upon reception of the control signal.

Alternatively, a person direction detection unit 107 in FIG. 6 may be used together with the person distance detection unit 118 to cause the control circuit 119 to generate the above control signal on the basis of the distance information output from the person distance detection unit 118 and the direction information output from the person direction detection unit 107.

In addition, the ninth embodiment may be executed in combination with the fourth, sixth, and eighth embodiments.

10th Embodiment

Figure 12:
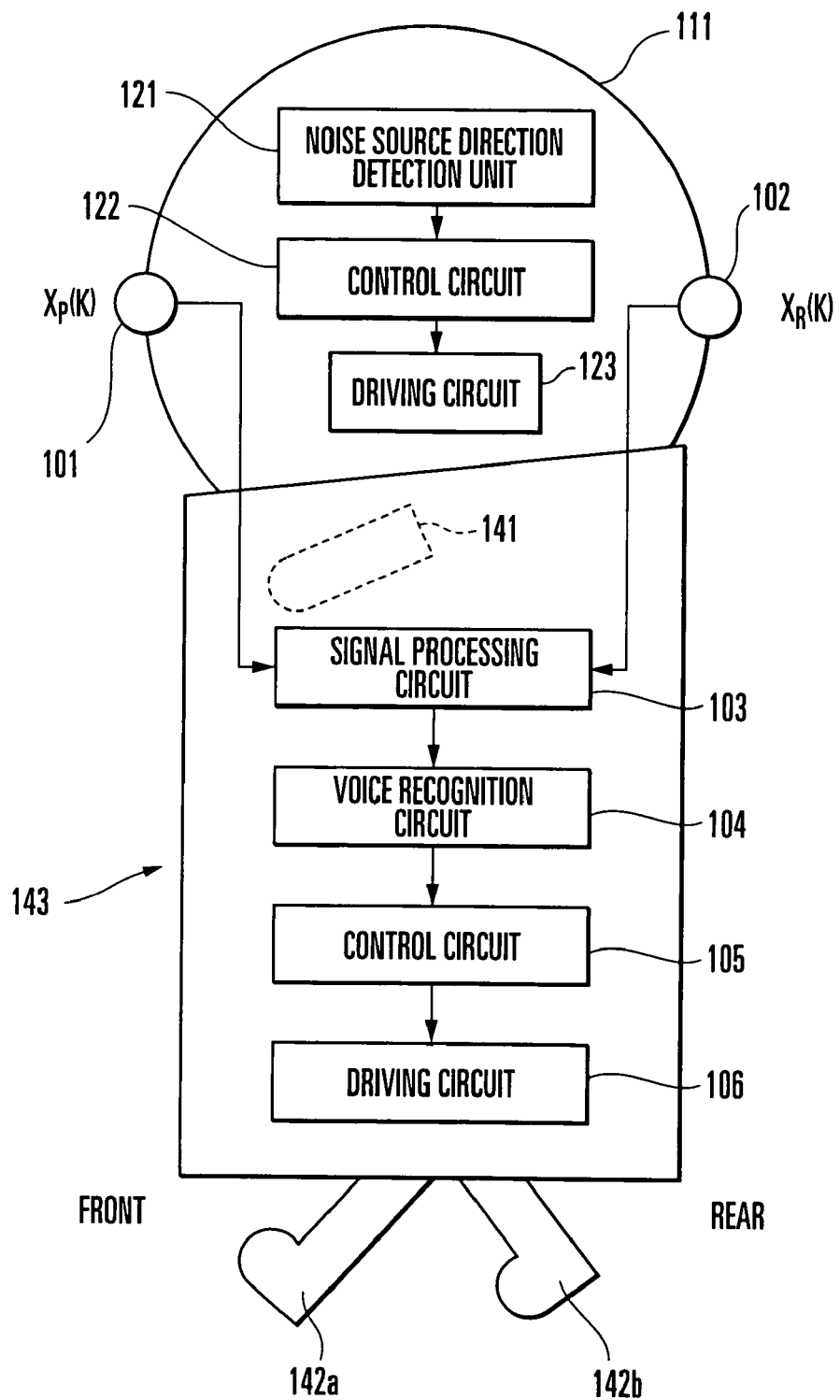
FIG. 12 is a view showing the arrangement of a robot according to the 10th embodiment of the present invention.

FIG. 12 shows the arrangement of a robot according to the 10th embodiment of the present invention. The same reference numerals as in FIG. 1 denote the same or equivalent components in FIG. 12.

The robot according to the 10th embodiment includes a noise source distance detection unit 121, operation unit (fifth operation means) 111, control circuit 122, and driving circuit 123 in addition to the components of the robot according to the first embodiment shown in FIG. 1.

In the 10th embodiment, a microphone 101 is mounted on the front surface of the operation unit 111. The microphone 101 generates a first sound reception signal by performing acoustoelectric conversion of an acoustic signal (target signal) mainly arriving from the front of the operation unit 111. The microphone 101 supplies the first sound reception signal as a main signal $X_P(k)$ to a signal processing circuit 103.

A microphone 102 is mounted on the rear surface of the operation unit 111. The microphone 102 generates a second sound reception signal by performing acoustoelectric conversion of an acoustic signal (noise other than a target signal) mainly arriving from the rear of the operation unit 111. The microphone 102 supplies the second sound reception signal as a reference signal $X_R(k)$ to the signal processing circuit 103.

The noise source distance detection unit 121 has a function of detecting a noise source around the robot and a function of outputting distance information indicating the distance from the robot to the noise source. The distance from the robot to the noise source can be obtained by, for example, mounting two cameras on the robot at a distance from each other, calculating a difference between the two pieces of image information acquired by the cameras, and referring to the distance between the cameras. Alternatively, the distance from the robot to the noise source can be obtained on the basis of the time interval between the instant at which an acoustic signal is transmitted from a transceiver for acoustic signals such as ultrasonic waves which is mounted on the robot and the instant at which the acoustic signal is reflected by the noise source and returns to the transceiver.

Upon reception of the distance information, the control circuit 122 generates and outputs a control signal for operating the operation unit 111 to move the microphone 101 closer to the position of the noise source. More specifically, upon reception of the distance information, the control circuit 122 generates and outputs a control signal for operating the operation unit 111 to set the distance between the microphone 101 and the noise source to be equal to or less than a predetermined value.

The driving circuit 123 receives the control signal and moves the operation unit 111 closer to the position of the noise source. At this time, the operation unit 111 connected to the robot body 143 may be moved closer to the position of the noise source by driving feet 142a and 142b of a robot body 143 so as to move the robot body 143 itself. Moving the operation unit 111 closer to the position of the noise source in this manner makes it possible to move the microphone 101 mounted on the operation unit 111 closer to the position of the noise source.

Other arrangements are the same as those in the first embodiment shown in FIG. 1.

Note that upon reception of the distance information, the control circuit 122 may output a control signal for operating the operation unit 111 to move the microphone 101 away from the position of the noise source (a control signal for operating the operation unit 111 to set the distance between the microphone 101 the noise source to be equal to more than a predetermined value), and the driving circuit 123 may operate the operation unit 111 to move away from the noise source upon reception of the control signal.

Alternatively, a noise source direction detection unit 109 in FIG. 7 may be used together with the noise source distance detection unit 121 to cause the control circuit 122 to generate the above control signal on the basis of the distance information output from the noise source distance detection unit 121 and the direction information output from the noise source direction detection unit 109.

In addition, the 10th embodiment may be executed in combination with the fifth, seventh, and eighth embodiments.

Figure 13:
FIG. 13 is a conceptual view showing a case wherein a microphone is comprised of microphones.
Figure 13:

In either of the first to 10th embodiments, as shown in FIG. 13, the microphone 101 can also be realized as a microphone array which is comprised of a plurality of microphones 110a and 101b and acquires signals in a specific direction.

Figure 14:
FIG. 14 is a conceptual view showing a case wherein a microphone is comprised of microphones.
Figure 14:

In either of the first to 10th embodiments, as shown in FIG. 14, the microphone 102 can also be realized as a microphone array which are comprised of a plurality of microphones 102a and 102b and acquires signals in a specific direction.

Note that it suffices if the number of microphones constituting a microphone array is an integer equal to more than two.

The functions and effects of the above embodiments will be summarized below.

In the above embodiments, since the microphone 102 gathers noise, a target signal can be discriminated from noise.

The microphone 102 gathers noise, and noise components mixed in an output signal from the microphone 101 are reduced by using the noise. With this operation, even in the presence of noise, a target signal can be accurately acquired, and the robot can be properly operated. In this case, when an adaptive filter is used to reduce noise components, even if the ambient environment changes, noise can be adaptively reduced.

By performing voice recognition for a target signal, the robot can be operated by voice.

In addition, since the direction of the microphone 101 differs from the direction of the microphone 102, noise generated from a direction other than the direction of a target signal can be reduced. Especially when the direction of the microphone 101 and the direction of the microphone 102 form an angle of 90° or more, the influence of a target signal mixed in the microphone 102 can be reduced. By setting the microphones 101 and 102 in opposite directions, the influence of a target signal mixed in the microphone 102 can be minimized.

Mounting the microphone 101 on the front surface of the robot and the microphone 102 on the rear surface of the robot makes it possible to gather a target signal and noise generated from the front and rear of the robot and efficiently reduce noise from the target signal.

In addition, by mounting the microphone 101 on the operation unit 111 and moving the operation unit 111 or the like to make the direction of the microphone 101 coincide with the direction of a target signal source, target signals can be mainly gathered by the microphone 101 regardless of the direction in which a target signal is generated with respect to the direction of the robot. In this case, when the direction of a target signal source is identified by using acoustic signal information, the target signal can be gathered from the direction in which the target signal is generated. Furthermore, by identifying the direction of a target signal source using image signal information, the target signal can be gathered from the direction in which the target signal is generated. Moreover, by identifying the direction of a target signal source using acoustic information and an image signal, the target signal can be gathered from the direction in which the target signal is generated.

In addition, by mounting the microphone 102 on the operation unit 111 or 116 and moving the operation unit 111, 116, or the like to make the direction of the microphone 102 coincide with the direction of a noise source, noise can be mainly gathered by the microphone 102 regardless of the direction in which noise is generated with respect to the direction of the robot. In this case, when the direction of a noise source is identified by using acoustic signal information, the noise can be gathered from the direction in which the noise is generated. Furthermore, by identifying the direction of a noise source using image signal information, the noise can be gathered from the direction in which the noise is generated. Moreover, by identifying the direction of a noise source using acoustic information and image signal information, the noise can be gathered from the direction in which the noise is generated.

By mounting the microphone 101 on the operation unit 111 and moving the operation unit 111 or the like to move the microphone 101 closer to a target signal source, a target signal can be mainly gathered by the microphone 101 even if the target signal is generated at a distance from the robot.

By mounting the microphone 102 on the operation unit 111 or 116 and moving the operation unit 111, 116, or the like to move the microphone 102 closer to a noise source, noise can be mainly gathered by the microphone 102 even if the noise is generated at a distance from the robot.

When the microphone 101 is realized by a microphone group including the microphones 101a and 101b, a target signal can be gathered from the direction specified by the microphone group.

When the microphone 102 is realized by a microphone group including the microphones 102a and 102b, noise can be gathered from the direction specified by the microphone group.

As has been described above, according to the above embodiments, when noise is present around the robot, the noise is acquired by using the microphone 102 different from the microphone 101 which acquires a target signal, and the noise mixed in a sound reception signal from the microphone 101 is reduced by using the acquired noise, thereby realizing a robot which can obtain a high-precision target signal.

What is claimed is:

1. A robot comprising:
 first sound gathering means for generating a first sound reception signal by gathering mainly a target signal;
 second sound gathering means for generating a second reception sound signal by gathering mainly noise other than the target signal; and first operation means which operates on the basis of the first sound reception signal output from said first sound gathering means and the second sound reception signal output from said second sound gathering means;

noise reduction means for generating a low-noise signal by reducing the noise components of the target signal on the basis of the first sound reception signal output from said first sound gathering means and the second sound reception signal output from said second sound gathering means;

target signal source direction detection means for detecting a direction of a target signal source and outputting direction information indicating the direction, and input switching means for inputting the first sound reception signal and the second sound reception signal to said noise reduction means and to perform switching of the first and second sound reception signals, when a direction of said second sound gathering means is closer to the direction of the target signal source than a direction of said first sound gathering means on the basis of the direction information output from said target signal source direction detection means, wherein the switching results in the first sound aathering means gathering mainly noise other than the target signal and the second sound gathering means gathering mainly the target signal, wherein said first and second sound gathering means are placed to face different directions on an outer housing of said robot, and wherein said first operation means operates on the basis of the low-noise signal output from said noise reduction means.

2. A robot according to claim 1, wherein said noise reduction means comprises an adaptive filter which approximates an acoustic path between said first sound gathering means and said second sound gathering means.

3. A robot according to claim 1, further comprising voice recognition means for performing voice recognition on the basis of the low-noise signal output from said noise reduction means, wherein said first operation means operates on the basis of a voice recognition result obtained by said voice recognition means.

4. A robot according to claim 1, wherein said first and second sound gathering means are placed to face directions forming an angle of not less than 90°.

5. A robot according to claim 1, wherein said first and second sound gathering means are placed to face opposite directions.

6. A robot according to claim 1, wherein
said first sound gathering means is placed on a front outer surface of said robot, and
said second sound gathering means is placed on a rear outer surface of said robot.

7. A robot according to claim 1, further comprising
second operation means which directs said first sound gathering means toward the target signal source on the basis of the direction information output from said target signal source direction detection means.

8. A robot according to claim 7, wherein said target signal source direction detection means detects a direction of the target signal source by using at least one of acoustic signal information and image signal information.

9. A robot according to claim 8, further comprising:
a first camera provided on the outer housing of said robot at a first position; and
a second camera provided on the outer housing of said robot at a second position different from the first position,
wherein the image signal information is obtained from images provided by said first and second cameras.

10. A robot according to claim 1, further comprising
target signal source distance detection means for detecting a distance to a target signal source and outputting distance information indicating the distance, and
fourth operation means which moves said first sound gathering means closer to a position of the target signal source on the basis of the distance information output from said target signal source distance detection means.

11. A robot according to claim 10, wherein said target signal source distance detection means detects a distance to the target signal source by using at least one of acoustic signal information and image signal information.

12. A robot according to claim 11, further comprising:
a first camera provided on the outer housing of said robot at a first position; and
a second camera provided on the outer housing of said robot at a second position different from the first position,
wherein the image signal information is obtained from images provided by said first and second cameras.

13. A robot according to claim 1, wherein said first sound gathering means comprises a microphone group including a plurality of microphones.

14. A robot according to claim 1, wherein said second sound gathering means comprises a microphone group including a plurality of microphones.

15. A robot comprising:
first sound gathering means for generating a first sound reception signal by gathering mainly a target signal;
second sound gathering means for generating a second reception sound signal by gathering mainly noise other than the target signal;
first operation means which operates on the basis of the first sound reception signal output from said first sound gathering means and the second sound reception signal output from said second sound gathering means;
noise reduction means for generating a low-noise signal by reducing the noise components of the target signal on the basis of the first sound reception signal output from said first sound gathering means and the second sound reception signal output from said second sound gathering means;
noise source direction detection means for detecting a direction of a noise source and outputting direction information indicating the direction, and
input switching means for inputting the first sound reception signal and the second sound reception signal to said noise reduction means and to perform switching of the first and second sound reception signals, when a direction of said first sound gathering means is closer to the direction of the noise source than a direction of said second sound gathering means on the basis of the direction information output from said noise source direction detection means, wherein the switching results in the first sound gathering means gathering mainly noise other than the target signal and the second sound gathering means gathering mainly the target signal,
wherein said first operation means operates on the basis of the low-noise signal output from said noise reduction means.

16. A robot according to claim 15, further comprising
noise source direction detection means for detecting a direction of a noise source and outputting direction information indicating the direction, and
third operation means which directs said second sound gathering means toward the noise source on the basis of the direction information output from said noise source direction detection means.

17. A robot according to claim 16, wherein said noise source direction detection means detects a direction of the noise source by using at least one of acoustic signal information and image signal information.

18. A robot according to claim 17, further comprising:
a first camera provided on the outer housing of said robot at a first position; and
a second camera provided on the outer housing of said robot at a second position different from the first position,
wherein the image signal information is obtained from images provided by said first and second cameras.

19. A robot according to claim 15, further comprising
noise source distance detection means for detecting a distance to a noise source and outputting distance information indicating the distance, and
fifth operation means which moves said second sound gathering means closer to a position of the noise source on the basis of the distance information output from said noise source distance detection means.

20. A robot according to claim 19, wherein said noise source distance detection means detects a distance to the noise source by using at least one of acoustic signal information and image signal information.

21. A robot according to claim 20, further comprising:
a first camera provided on the outer housing of said robot at a first position; and
a second camera provided on the outer housing of said robot at a second position different from the first position,
wherein the image signal information is obtained from images provided by said first and second cameras.

22. A robot according to claim 15, wherein said noise reduction means comprises an adaptive filter which approximates an acoustic path between said first sound gathering means and said second sound gathering means.

23. A robot according to claim 15, further comprising voice recognition means for performing voice recognition on the basis of the low-noise signal output from said noise reduction means,
wherein said first operation means operates on the basis of a voice recognition result obtained by said voice recognition means.

24. A robot according to claim 15, wherein said first and second sound gathering means are placed to face directions forming an angle of not less than 90°.

25. A robot according to claim 15, wherein said first and second sound gathering means are placed to face opposite directions.

26. A robot according to claim 15, wherein
said first sound gathering means is placed on a front outer surface of said robot, and
said second sound gathering means is placed on a rear outer surface of said robot.

27. A robot according to claim 15, wherein said first sound gathering means comprises a microphone group including a plurality of microphones.

28. A robot according to claim 15, wherein said second sound gathering means comprises a microphone group including a plurality of microphones.

* * * * *